HIGH PRESSURE SOFT SEAT VALVE

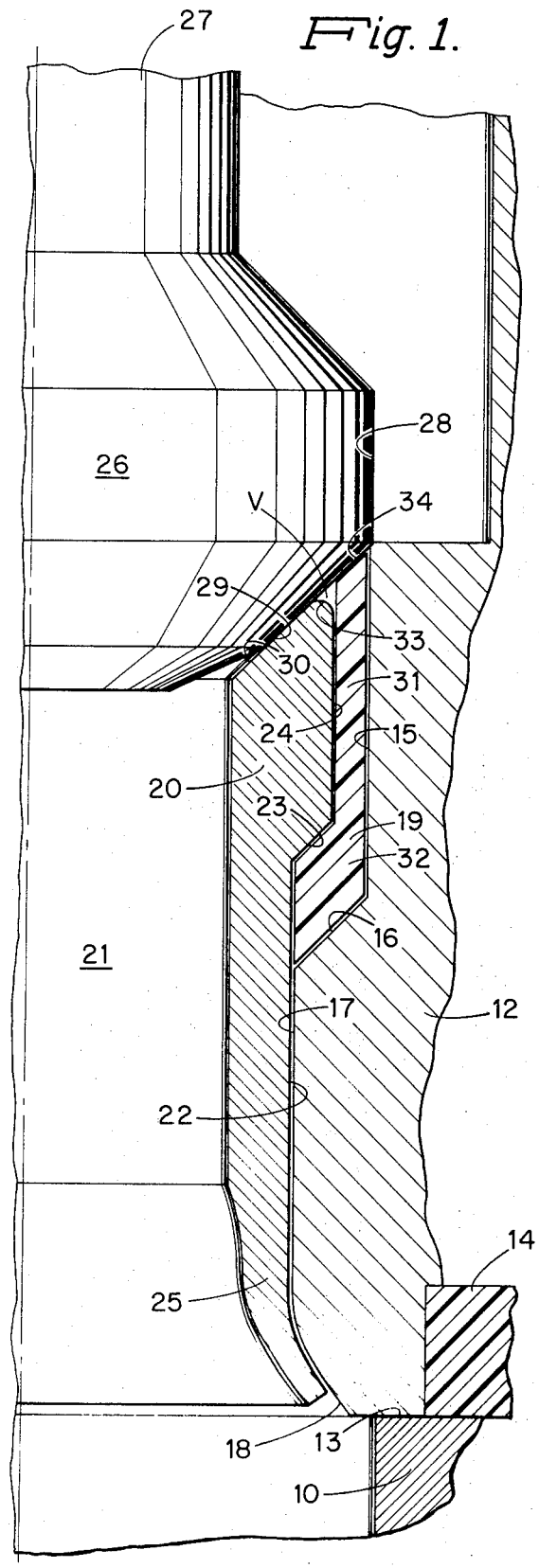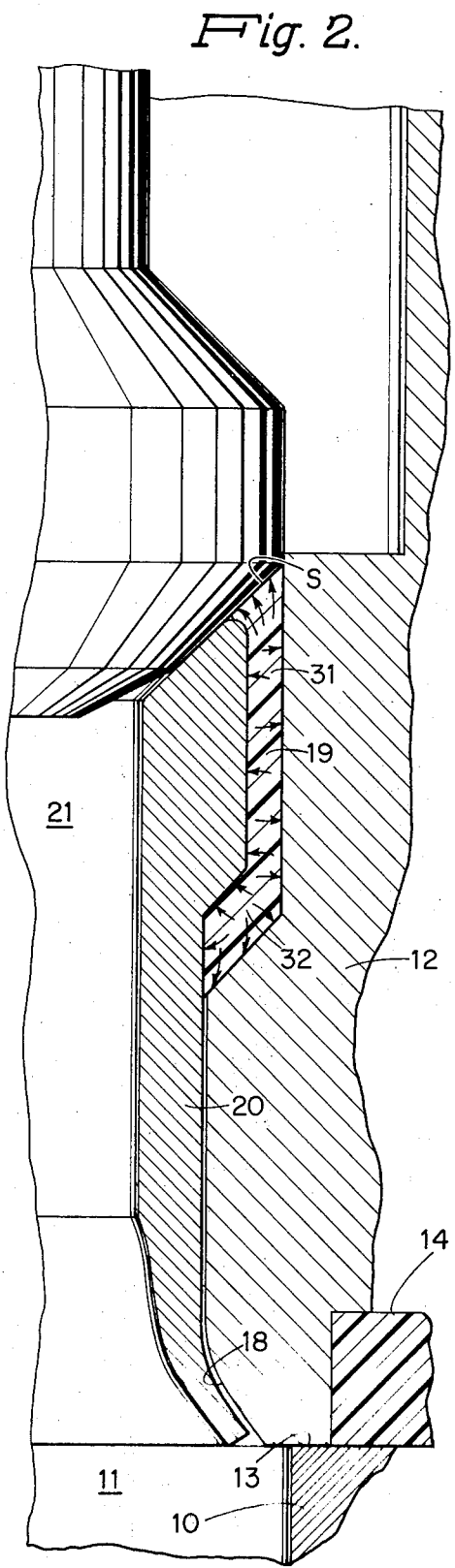

BACKGROUND OF THE INVENTION

In high pressure fluid systems whose pressure containing or flow shutoff subjects their control valves to differential pressures on the order of several thousand pounds per square inch, such as for example boiler feed water systems, destructive wear is experienced with conventional valves rely on metal-to-metal seating. More particularly, the metal-to-metal valve seats or seals, which initially are not perfectly leakproof, are subject to corrosion of the metal surfaces, by destructive action of the boiler feed water or other contained, high pressure fluid medium.

Still more particularly, microscopic leakage paths are formed in the metal valve or plug and seat surfaces, that are rapidly enlarged by the destructive, velocity-impacted mechanism of the aforesaid contained medium. As a result, in the high pressure, wear inducing fluid medium applications here concerned, the conventional, metal-to-metal seating surface valves are leaky and short-lived in their use, and require too frequent repair or replacement.

This invention solves the above mentioned problem by providing a deformable seating or sealing element isolating the otherwise leak-prone valve sealing surfaces from the destructive fluid medium, through the element being arranged to be highly pressured by the valve closing, and in that to be conformed to the metal valve surfaces so as to effect wanted, tight shutoff of the contained medium. For such purpose the deformable sealing element more particularly is interposed axially between the telescoping valve elements, for its pressuring or compressing by the valve closing to set up the wear eliminating barrier seal.

Self 3,473,783 discloses a resilient sealing element which is described as completely surrounded and volumetrically compressed. But the Self 3,473,783 arrangement is one in which the resilient element is interposed radially, between the surrounding telescoping parts, or spindle and seat ring. In Self the resilient element compressing is solely by a sliding sleeve and not at the primary sealing interface, and the resilient element is carried by the reciprocating spindle element to press radially against a juxtaposed cylindrical wall of the fixed seat element. With such an arrangement, the subjecting of the resilient element to pressures exceeding the very high contained fluid medium pressures here concerned is found to make the resilient element stick, or resist separation. Furthermore, ultimate separation, i.e., sliding out of the valve plug, could cause axial scratches in the interior seating surface of the resilient element, posing leakage problems, in addition to high static friction, which could interfere with smooth automatic control. And the Self arrangement is otherwise unsuited to, and improved upon by this invention for, applicant's purposes.

BRIEF SUMMARY OF THE INVENTION

Apparatus for flow controlling or valving high pressure fluid system, and incorporating a deformable plastic seat ring member compressed by the valve closing to establish a contained-medium-isolating, liquid-like or hydrostatic seal. The deformable, plastic, liquid-like sealing element, or seat ring, is received on a seat ring housing, and held and also differentially engaged thereon by a seat ring retainer.

The valve plug, in telescoping within the seat ring housing in its closing or seating movement, engages and axially compresses the seat ring, and also differentially advances the retainer to additionally axially compress the seat ring, and in that effect a volumetric reduction of the seat ring space serving to pressure the deformable seat ring to the wanted, liquid-like flow inducing, contained medium pressure exceeding, degree. The hydrostatic seal of the insert seat ring to the pressuring plug surface is an axially compressing one rather than a radially expanding one, and the contained fluid medium isolating, hydrostatic seal also is accompanied by metal-to-metal backup on the same sealing line in the downstream direction.

BRIEF DESCRIPTION OF THE DRAWINGS

In the accompanying drawings showing a preferred embodiment:

FIG. 1 is a vertical section of the valve assembly with the plug in initially seated or closed position;

FIG. 2 is a like view exaggeratedly showing the seat ring deforming advance of the valve plug under plastic flow inducing pressure to set up the hydrostatic barrier seal under the invention.

DESCRIPTION OF THE PREFERRED EMBODIMENT

Figure 3:
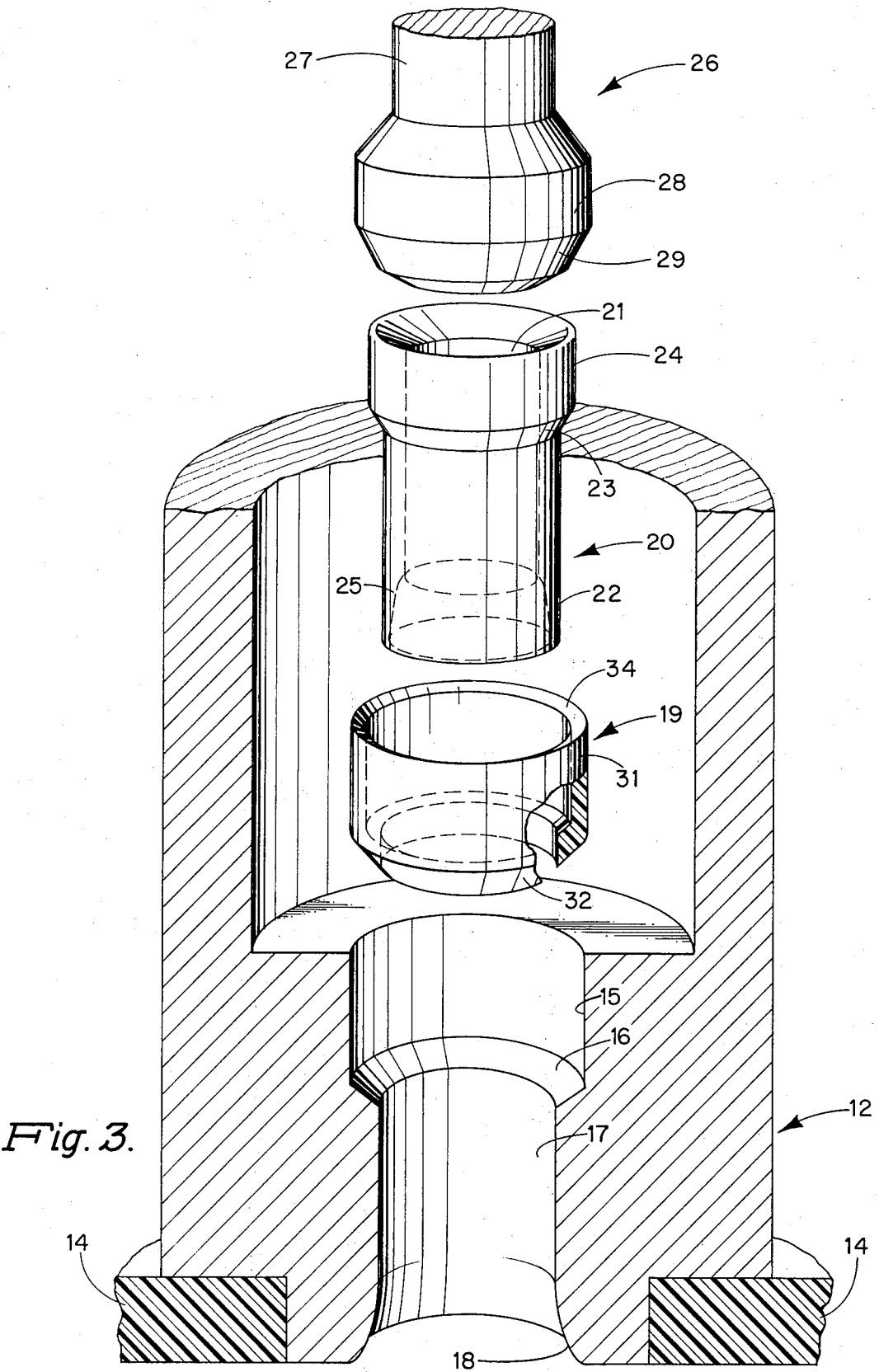
FIG. 3 is an exploded perspective of the valve assembly of FIGS. 1 and 2.

A valve body 10, formed centrally with a fluid flow passage 11, comprises part of a boiler feed water or the like fluid system. As well understood in the art, the fluid medium to be contained under high pressures in such system, through its correspondingly high pressure differentials across the system valves, is highly destructive of the conventional or metal-to-metal valve seating or sealing surfaces, eroding or pitting the same with leakage paths by the velocity-impact mechanism with which it attends the repeated valve closings.

The valve body 10 is fitted for such valving, or fluid shutoff, by metal annulus or annular seat ring housing 12 received therewithin, as may be seated on a valve body shoulder 13 and sealed thereto by a gasket 14.

Seat ring housing 12 is formed at its inside face with an upper, seat ring receiving portion comprising a relatively larger diameter or outer axial or cylindrical wall 15 extending upwardly to the end or top of the housing 12.

Below said wall 15 housing 12 has an intermediate, non-vertical or inturned wall 16, herein downwardly inclined or conical, and extending relatively shortly to a lower portion, relatively smaller diameter or inner axial or cylindrical wall 17 extending below or downwardly from wall 15 a suitable retainer bearing length to an enlarged or flaring end or bottom 18.

A deformable plastic insert seat ring 19 is received on housing 12 and to be enclosed between that and the seat ring retainer and valve plug parts to be described.

A metal insert, seat ring retainer 20 has a central opening or fluid passage 21 therethrough, is received within and telescopes with housing 12, and is formed at its outside face with an axial or cylindrical, relatively smaller diameter or inner wall 22 sliding on mating housing inner wall 17, and predeterminedly extending thereabove to an intermediate, non-vertical or outturned, herein upwardly inclined or conical wall 23

In its described pressuring, again, the liquid-like seat ring 19 undergoes an internal stress generating pressures exceeding the fluid pressure of the medium to be contained, while at the same time retaining a sufficient viscosity to avoid penetrating the surrounding metal-to-metal interfaces, or, in other words, leaking out of its confinement.

In this connection it is again emphasized that, under this invention, the primary plastic-to-metal seal between the outer portion of the pressuring plug face 29 and the opposed or sealing surface 34 of seat 19 is seconded by the substantial width, metal-to-metal backup seal, in the downstream direction between the piston and retainer surfaces 29, 30.

The Teflon or fluorocarbon or similar soft seat ring 19 has some memory, whereby upon the release of the closing pressure on the plug 26 setting up the hydrostatic seal, there occurs a return of the retainer 20 substantially to the FIG. 1 position, and the piston-to-soft seat engagement is released without difficulty.

I claim:

1. In a valve for tight shutoff of high pressure fluid flow, in combination:
   a valve body having an axial passage therewithin for flow of pressure fluid therethrough;
   a rigid metal seat ring housing comprised within said valve body and having an inside face defining a portion of said passage;
   relatively outer and inner axial walls comprising upper and lower portions of said housing inside face;
   an inturned wall comprising an intermediate portion of, and extending between said axial upper and lower portions of, said housing inside face;
   a rigid metal seat ring retainer received within said housing and having an outside face;
   an outturned wall comprising an intermediate portion of said retainer outside face, said outturned retainer wall lying within said upper axial wall of, and facing and spaced from said inturned wall of, said housing inside face;
   a relatively inner, axial wall comprising a lower portion of said retainer outside face, said relatively inner, lower portion, axial, retainer outside face wall sliding on said relatively inner, lower portion, axial, housing inside face wall, and extending upwardly thereof to said outturned, intermediate portion wall of said retainer outside face;
   a relatively outer wall comprising an upper portion of said retainer outside face, said relatively outer, upper portion retainer outside face wall extending upwardly from said outturned, intermediate portion, retainer outside face wall in spaced relation to said axial, upper portion housing inside face wall;
   an inclined top bearing surface on said seat ring retainer, said top bearing surface extending radially inward from said relatively outer, upper portion wall of said retainer outside face;
   a rigid metal valve plug received within said valve body;
   an axial waist on said valve plug sliding on said axial upper portion wall of said housing inside face;
   a seating face on said valve plug, said seating face extending radially inward from said plug waist so as to overlie said top bearing surface of said seat ring retainer,
   said plug seating face also inclined at the same angle as, and so as upon engagement to establish metal-to-metal seal with, said retainer top bearing surface; and
   a deformable plastic seat ring disposed in and substantially filling the unreduced space between said seat ring housing, said seat ring retainer, and said valve plug, said plastic seat ring enclosed and engaged at its sides and bottom by said seat ring housing and seat ring retainer, and said plastic seat ring having an upper portion projecting at its top to substantially engage said valve plug seating face; whereby,
   upon the closing movement of said valve plug to engage its seating face to said seat ring and seat ring retainer under pressure to effect seat-ring-compressing closing of said outturned retainer wall towards said facing, inturned, housing wall, and to effect seat-ring-compressing depressing also of said seat ring top,
   and with said seat ring compressing by valve seating force applied to said plug being sufficient both to stress said deformable seat ring above the yield point and cause it to act like a liquid, and to subject said deformable, liquid-like seat ring to a pressure exceeding the pressure of the fluid medium to be contained by said valve,
   said seat ring is deformed and displaced to fill completely the volumetrically-reduced space thereby defined between said valve plug, seat ring housing and seat ring retainer, and to establish therebetween a plastic-to-metal, hydrostatic sealing interface effective always and independently of wear of the engaging surfaces of flow of said pressure fluid.

2. A valve according to claim 1, wherein said plastic seat ring top is formed opposite said plug seating face with a flat sealing face inclined at the same angle as, and located on substantially the same inclined plane as, said top bearing surface of said metal seat ring retainer.

3. A valve according to claim 1 wherein said relatively outer, upper portion wall of said seat ring retainer outside face is an axial wall.

4. A valve according to claim 1, wherein said facing, inturned and outturned seat ring housing and seat ring retainer walls are inclined at substantially the same angle.

5. A valve according to claim 1, and means on said seat ring retainer engaging said seat ring housing to prevent the axial separation of said retainer and housing.

6. A valve according to claim 5, wherein said separation preventing means comprise flaring extensions of said axial, telescoping seat ring housing and retainer walls.

7. A valve according to claim 1, wherein said plastic seat ring is formed at its top initially to leave a void between its said top and said top-surrounding, plug seating face and upper housing and retainer portion walls, and wherein, upon said compressing of said seat ring by the closing together of said facing, inturned and outturned housing and retainer walls, said deforming and displacing of said plastic seat ring at its said top is to fill said void, and in that void-filling to flow conformantly to and therefore seal fluid-tight against said surrounding plug seating face and upper portion housing and retainer walls.

* * * * *

UNITED STATES PATENT OFFICE
CERTIFICATE OF CORRECTION

Patent No. 3,809,362  Dated May 7, 1974

Inventor(s) Hans D. Baumann

It is certified that error appears in the above-identified patent and that said Letters Patent are hereby corrected as shown below:

In column 3, line 16, "19." should read

-- 19 therebetween.--

In Column 6, line 34, "the engaging surfaces of flow of said pressure fluid" should read -- the engaging surfaces of said plug, housing and retainer to completely shut off the flow of said pressure fluid. --

Signed and Sealed this

Twenty-sixth Day of April 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,809,362　　　　　　　　　　Dated May 7, 1974

Inventor(s)　　Hans D. Baumann

It is certified that error appears in the above-identified patent and that said Letters Patent are hereby corrected as shown below:

In column 3, line 16, "19." should read -- 19 therebetween.--

In Column 6, line 34, "the engaging surfaces of flow of said pressure fluid" should read -- the engaging surfaces of said plug, housing and retainer to completely shut off the flow of said pressure fluid. --

Signed and Sealed this

Twenty-sixth Day of April 1977

[SEAL]

Attest:

RUTH C. MASON
*Attesting Officer*

C. MARSHALL DANN
*Commissioner of Patents and Trademarks*